Jan. 18, 1927.

T. BOVEY 1,615,068

CONTROL DEVICE FOR AUTOMOBILE HEATERS

Original Filed Feb. 14, 1925

Witness:
Chas. F. Koursh

Inventor,
THOMAS BOVEY
Thomason & Lundy  Attys

Patented Jan. 18, 1927.

1,615,068

UNITED STATES PATENT OFFICE.

THOMAS BOVEY, OF CHICAGO, ILLINOIS.

CONTROL DEVICE FOR AUTOMOBILE HEATERS.

Application filed February 14, 1925, Serial No. 9,275. Renewed December 1, 1926.

My present invention relates to a device for opening and closing the valve that controls the flow of hot gases from the exhaust pipe of an automobile engine to the heater in the body of the vehicle. The divers objects of my invention reside in the provision of a structure of this character that is capable of being easily installed in the vehicle within ready reach of the operator; that is simple in construction and operation; is fabricated from a minimum of parts; is novel in the construction and assembly of the parts; and which is dependable and sturdy in use.

I prefer to carry out my invention and accomplish the before mentioned objects in substantially the manner hereinafter disclosed and as more particularly pointed out in the claims. For a further and detailed understanding of my invention, I now refer to the accompanying drawings that illustrate a typical or preferred embodiment thereof.

In the drawings:—

Figure 1:
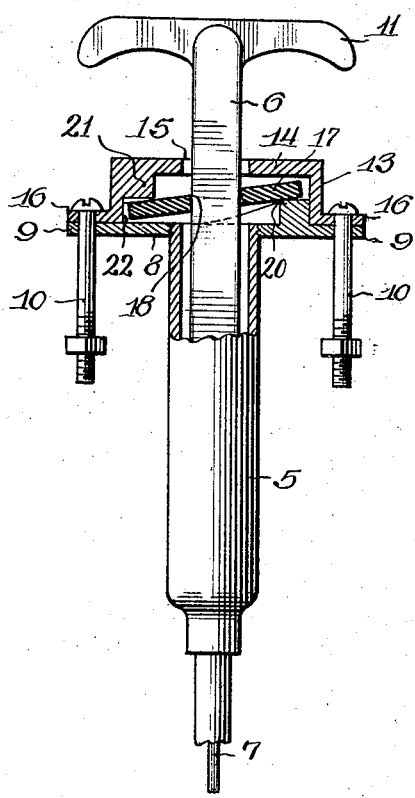
Fig. 1 is a vertical longitudinal section of my invention, portions thereof being shown in elevation.
Figure 2:
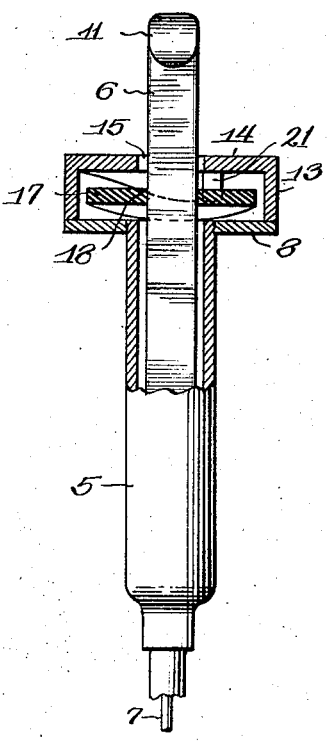
Fig. 2 is a similar view at right angle to Fig. 1.
Figure 3:
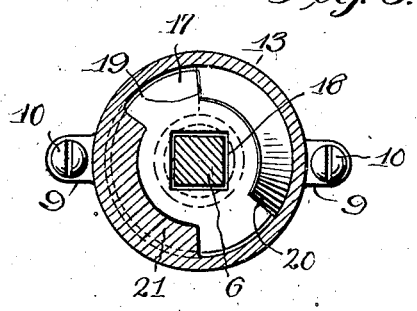
Fig. 3 is a transverse horizontal section on line 3—3 of Fig. 1.

In the drawings, I have employed similar reference characters to designate like parts wherever they appear in the several views. By primarily observing the structure in Fig. 1 it will be seen I have provided an elongated tube 5 that is of suitable dimensions to accommodate the lower portion of the operating spindle 6 that has an element 7 suitably connected to it that leads to the valve at or adjacent the exhaust pipe leading from the outlet manifold of the internal combustion engine. Extended laterally from the upper end of tube 5 is a flange 8 of disk-like form that may be either screwed onto or made integrally with the tube, and said flange affords a base for the mounting of the structure upon the floor of the automobile. Extended from opposite edges of the flange are radial ears 9 that are apertured for the passage of the bolts 10 that secure the device in position. The spindle 6 is of angular cross section and its upper portion extends above the flange 8 and outside a housing mounted on the latter and is provided upon this extended end with a crosspiece 11 that provides a hand grasp for raising or lowering or rotating the spindle whenever desired.

Coacting with the flange 8 and preferably resting thereon is a cylindrical housing 13 that is open at its bottom and has an integral top wall or closure 14 provided with a centrally disposed aperture 15 of circular outline, and the lower portions of the side wall of this housing are provided with apertured radial lugs 16 adapted to register with the lugs 9 on the flange 8 when the parts are assembled. In mounting the structure in the automobile floor board, a suitable hole is made in the same to receive the tube 5 with the flange 8 thereof resting upon the upper surface of the board, after which the housing is placed upon the flange with the respective lugs in register so that the bolts or screws 10 may be inserted through the alining apertures in the lugs and passed through the board to be securely clamped thereto by the nuts that are screwed onto said bolts.

Figure 4:
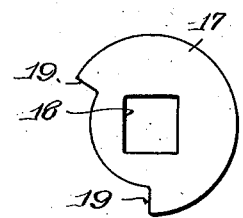
Fig. 4 is a detail of the clamping annulus.

When the handle is in its upper and lower limits of movement the valve at the exhaust pipe is either fully opened or fully closed according to the manner of connection with the valve lever or stem. In order to maintain the handle and spindle in any position of adjustment I have provided suitable cam structures that coact with the spindle and securely bind on the same when in its divers positions, and at the same time will permit of the ready release of the spindle for the purpose of movement or adjustment. The element that coacts with the spindle is preferably in the form of a mutilated or segment disk or annulus, 17 having a circular periphery and is of less diameter than the inside diameter of the housing so that it is enclosed therein and preferably disposed concentric thereto. The central axial opening 18 in the annulus is of angular contour that corresponds to the shape of the spindle 6 and its dimensions are such that a sliding fit is provided between the annulus and the spindle. The annulus has a portion, approximately one-third, of its periphery cut away as indicated at 19 in Fig. 4, and arising from the flange 8 is a cam or wedge projection 20 of such dimensions and shape that when the annulus is in a horizontal position, or in a plane at a right angle to the axis of the spindle 6, the cut away portion 19 will fit around the projection and the annulus will rest flat upon the upper surface of the flange 8. This will permit the spindle to be moved back or forth in the aperture 18 of the annulus to adjust the valve to the required position, but upon the spindle being rotated to the right or clockwise the unmutilated or wider portion of the annulus will ride up the cam surface of the projection 20 until an inclination is reached that will cause two opposite corner edges of the aperture 18 to bind against opposite faces of the spindle and securely lock the same against movement and thus maintain the valve in adjusted position. Diametrically opposite the projection 20 there is provided a similar projection 21 extending from the side and top walls of the housing, the lower portion of said projection being spaced far enough from the flange 8 to provide therewith a channel or groove 22 in which the edge portion of the annulus is disposed and guided.

What I claim is:—

1. A device of the kind described comprising a rotatable longitudinally movable spindle, a rotatable mutilated disk having an aperture through which said spindle is movable, a housing enclosing said disk, and a projection within said housing upon which the disk rests in a tilted position to bind upon said spindle and with which the mutilated portion coacts to return said disk to normal position and release said spindle.

2. A device of the kind described comprising a rotatable longitudinally movable spindle, a rotatable mutilated disk having an aperture through which said spindle is movable, a housing enclosing said disk, and oppositely disposed cam projections extending upwardly and downwardly within said housing, the upwardly extending projection adapted to tilt said disk to bind the same against said spindle and coact with the mutilated portion of said disk to release the same.

3. A device of the kind described comprising a rotatable longitudinally movable spindle of angular section, a rotatable disk having an angular aperture through which said spindle is moved, a cam having a wedge inclined upwardly whereby to tilt said disk and cause the same to bind against said spindle, said disk having a cut away portion extending inwardly from its periphery and adapted to coact with said cam whereby to position said disk at a right angle to said spindle and release the same.

4. A device of the kind described comprising a rotatable longitudinally movable spindle, a rotatable disk having an aperture through which said spindle is movable, a portion of said disk provided with a recess and the remaining portion being plane, retaining means for said disk, and a projection upon which the disk rests in a tilted position to bind on said spindle and which is adapted to enter the recessed portion of the disk to return the disk to normal position and release said spindle.

5. A device of the kind described comprising a rotatable longitudinally movable spindle, a rotatable disk having an aperture through which said spindle is movable, a portion of said disk provided with a recess and the remaining portion being plane, retaining means for said disk, and oppositely disposed cam elements between which the plane portion of the disk is adapted to be disposed to tilt the disk and bind the same against the spindle, one of said elements adapted to enter the recessed portion of the disk, to release the spindle.

6. A device of the kind described comprising a rotatable longitudinally movable spindle, a rotatable disk having an aperture through which the spindle is movable, a portion of the disk provided with a recess and the remaining portion being plane, and means for causing an orientation of the disk to bind against the spindle when rotated to one position, said means adapted to receive the recessed portion of the disk to return said disk to its normal plane and release the spindle.

Signed at Chicago, in the county of Cook, and State of Illinois, this 26th day of January, 1925.

THOMAS BOVEY.